United States Patent [19]

Trousil

[11] 4,282,131
[45] Aug. 4, 1981

[54] CAR UNDERCOATING COMPOSITION

[75] Inventor: Edward G. Trousil, Arvada, Colo.

[73] Assignee: Chapman Enterprises Corp., Waterloo, Iowa

[21] Appl. No.: 119,952

[22] Filed: Feb. 8, 1980

[51] Int. Cl.³ .............................................. C08L 9.08
[52] U.S. Cl. ...................... 260/29.7 R; 260/33.4 PQ; 260/33.6 UA; 260/42; 424/291; 427/388.4; 428/454
[58] Field of Search ................. 260/29.7 R, 29.7 GP, 260/29.7 M, 42.15, 42.37, 42.47, 22, 33.6 UA, 33.4 PQ, 42; 106/74, 84, DIG. 3, 291; 428/446, 450, 363, 454; 427/421, 427, 388.4, 388.2, 428, 429; 424/291

[56] References Cited

U.S. PATENT DOCUMENTS

| 2,611,719 | 9/1952 | Borders ................................ 117/161 |
| 2,701,780 | 2/1955 | Nelson ................................. 154/43 |
| 3,037,881 | 6/1962 | McDowell ....................... 428/454 X |
| 3,766,105 | 10/1973 | Chan ................................ 106/291 X |
| 3,832,274 | 8/1974 | Owston ................................ 161/183 |
| 3,912,154 | 10/1975 | Godar ................................. 229/5.5 |
| 3,951,899 | 4/1976 | Seiner ...................... 260/29.7 GP X |
| 3,955,036 | 5/1976 | Pluddemann ....................... 428/429 |
| 4,081,584 | 3/1978 | Sakaj ................................. 428/514 |
| 4,096,307 | 6/1977 | Lagowski ....................... 428/214 4n |
| 4,136,137 | 1/1979 | Hsieh ................................. 260/380 |
| 4,173,665 | 11/1979 | Nida ........................... 260/29.7 M X |

Primary Examiner—Ronald H. Smith
Assistant Examiner—Thurman K. Page
Attorney, Agent, or Firm—Zarley, McKee, Thomte, Voorhhees & Sease

[57] ABSTRACT

An improved, water based, undercoating composition, primarily designed for undercoating of vehicles to prevent corrosion. It is a butadiene-styrene based polymer latex composition which contains from about 5% to about 20% by weight of mica as a filler and flattener which provides an effective moisture barrier and also functions to prevent premature gelling of the composition in combination with a sufficient amount of ammonium hydroxide to provide a composition pH within the range of 7.5 to 10.0 and, in addition, to provide enhancement of anti-foaming properties of the composition. The balance comprises small but effective amounts of minors such as a wetting agent, a defoaming agent, a dispersing agent, pigment, viscosity modifiers, and water. Also, disclosed is a solvent based, stryene butadiene coating.

8 Claims, No Drawings

CAR UNDERCOATING COMPOSITION

BACKGROUND OF THE INVENTION

This invention relates primarily to a water based protective coating composition which is most particularly useful for undercoating of vehicles to prevent corrosion. As explained later herein, the composition may if desired, be modified to provide a solvent base system; however, it is most preferred that the composition be aqueous in order to eliminate some inherent problems in solvent based systems such as odor, potential flame hazards, and the like.

Generally in the metal coating industry, and particularly in the automobile undercoating industry, there is a continuing need for coatings which provide good corrosion resistance. An effective undercoating for metal substrates, particularly automobiles, should be one which upon drying provides a good, strong, tough film. Additionally, the film should have a high solids content which not only enhances corrosion resistance but also allows the film to provide some sound, or noise, insulation. Then too, a satisfactory film should be one which has good adherence properties to the underlying substrate. Finally, a good undercoating composition should be one which is not only effective but economical to manufacture and one which is easy for a user to apply. With regard to ease of application, one problem which often occurs in spraying of undercoating compositions is that they will have a tendency to "overspray". Ideally, a good composition will have a narrow but effective spray pattern.

A primary object of this invention is to provide a butadiene styrene latex coating composition, particularly an aqueous composition, which achieves each of the above desirable attributes.

Another object of this invention is to provide a butadiene styrene latex coating composition using mica as a filling and flattening agent, and also employing a newly found advantage that if mica is employed as a filling and flattening agent, it also stabilizes the composition to prevent premature gelling.

A further object of this invention is to provide a product of enhanced anti-foaming properties. That is to say, foaming is undesirable and providing that ammonium hydroxide is used as a pH control agent to provide a pH within the range of 7.5 to 10.0, for reasons that are unknown, the ammonium hydroxide enhances the effectiveness of the defoaming agents employed.

Yet another object of this invention is to provide a method of manufacture of a latex, butadiene styrene car undercoating system.

An even further object of this invention is to provide a high solids content coating, even as high as 45-50%, for a solvent based butadiene styrene polymer system.

Yet another object of the invention is to provide a coating composition which upon drying provides a barrier to moisture which is effective because of overlapping platelets of mica.

The method and means of accomplishing these objectives, and others, will become apparent from the detailed description of the invention which follows.

DETAILED DESCRIPTION OF THE INVENTION

The emulsion system, or film former of this invention, is a polymer substance made by emulsion polymerization of a co-polymer of styrene and 1,3 butadiene. Butadiene styrene copolymers, of course, are generally known. Those satisfactory for use herein have a butadiene:styrene ratio between about 30:70 and about 95:5, preferably between about 60:40 and 80:20, with an optimum ratio being in the range of 70:30 to 75:25. One particularly satisfactory latex is sold by the B. F. Goodrich Company Chemical Division under the trademark Good-Rite Latex No. 1800-X-73. This latex contains approximately 45% solids. It, of course, goes without saying that other butadiene styrene latex emulsion systems are available and may be used herein.

While butadiene styrene latex emulsion systems have in the past been used for coating compositions, to the knowledge of the applicants, they have not heretofore been used as car undercoating compositions. Primarily, they have been used in conventional paint compositions and for uses such as carpet backing. In the recent past, they have not been used significantly in paints because of their tendency to oxidize in the presence of ultraviolet light. Upon oxidation their coating effectiveness is decreased.

In accordance with applicants' invention, it has been discovered that effective butadiene styrene emulsion systems can be used for car undercoating, providing that the system is formulated in accordance with the hereinafter described techniques. In particular, if the composition employs mica as the filler and flattening agent, the composition has improved corrosion resistance in that it is impermeable to moisture transmission and in addition, the mica also seems to stabilize against premature gelling during the manufacturing of the composition by substantially increasing the mechanical stability of the composition.

As heretofore explained, the primary latex emulsion or polymer of this system is a butadiene styrene system of the type previously described. The butadiene styrene emulsion typically may comprise from about 40% to about 65% by weight of the emulsion system. It is conceivable that an even broader range, for example, from 10% to about 70% may be employed; however, for the compositions of this invention, it is highly preferred that the amount be within the range of 40% to 65% by weight of styrene butadiene emulsion.

Turning now to the aqueous emulsion system which employs mica as the filler and flattening agent. Mica can be defined as any of several silicates of varying chemical composition, but all having similar physical properties and crystal structure. The uniqueness of mica is its characteristic crystal structure which allows it to cleave into thin sheets which are flexible and elastic. Thus, mica differs from other silicates primarily by crystaline structure in that even after being ground, it still is in the form of thin platelets. In the composition of the present invention, the amount of mica which may be employed can be from about 5% to about 20% by weight of the composition, preferably from about 8% to about 15% by weight of the composition.

In the compositions of the present invention, primarily the aqueous butadiene styrene emulsion system, the mica performs several important functions from the standpoint of enhancing the corrosion resistance, when compared to other butadiene styrene emulsion systems not using mica. First, after coating of a metal substrate, when the water evaporates and the latex emulsion coalesces, the individual particles of mica are drawn closer together and themselves form an overlapping structure to provide a substantially moisture impervious barrier.

This moisture impervious barrier effectively prevents water vapor transmission to the underlying metal substrate. This cannot be achieved with other filling and flattening agents which do not exhibit a plate-like crystaline structure, since they will not form and overlap upon setting of the emulsion, as will mica. Secondly, for reasons which are unknown, the mica seems to prevent premature gelling of the system during mixing. This is a problem which often occurs, but for reasons unknown to the applicants, seems not to occur when mica is employed. Thus, the mica can be thought of as enhancing the processability of this system from the standpoint of preventing premature gelling during mixing.

Mica, of course, can be obtained from a variety of sources. One which has been used satisfactorily herein is 325 mesh water ground mica produced by English Mica. Another which is satisfactory is 325 mesh water ground mica produced by Smithko. Satisfactory and preferred mica can be obtained from Thompson, Weinman and Company, with offices at Carterville, Georgia. The mica product obtained from them is described in their product bulletin, PB-10 which is incorporated herein by reference. Microscopic examination of the mica described in the previously referenced bulletin which chemically is a combination of hydrated magnesium and aluminum silicates, reveals that it shows a large proportion of the particles to be "plate-like" in structure. The Thompson, Weinman and Company mica is the preferred for use in this invention.

Certain of the minors, hereinafter described, tend to make the composition acidic which is undesirable from the standpoint of use and stability. Therefore, a base must be added. Numerous bases have been tried but it has been found that ammonium hydroxide is the most suitable. The amount of ammonium hydroxide can vary, but it should be a sufficient amount to provide a pH within the range of 7.5 to 10.0, preferably within 8.5 to 9.0. Typically the amount can be from about 0.05% to about 4% by weight, assuming 26 Baume ammonium hydroxide. Of course, if the ammonium hydroxide concentration varies from that specified herein, the amount of ammonium hydroxide will vary. But the important factor is a sufficient amount to provide a pH within the range of 7.5 to 10.0 and for maximum stability, within the range of 8.5 to 9.0.

Foaming is, of course, undesirable during processing and application, since foaming would cause air voids which would allow permeability of the coating after drying. Therefore, defoamers are employed in the composition. Surprisingly, and for reasons not fully understood, the ammonium hydroxide enhances the effectiveness of the anti-foaming agents. Other bases do not seem to provide this effect.

In addition to these major components heretofore listed, that is, the butadiene styrene latex emulsion, the mica filler and flattening agent, and the base adjusting component (ammonium hydroxide), the emulsion system is comprised of several other conventional ingredients, referred to herein as minors. These minors, include bacteriostatic agents, wetting agents, defoaming agents, pigment, and viscosity modifiers. Each of these will only be described briefly.

Suitable bacteriostatic agents are added, as the term implies, in order to provide bacterial resistance. Typically the amount employed may be from 0.02% by weight to about 0.2% by weight of the composition. One which has been found particularly useful in the aqueous butadiene styrene emulsion systems of this invention is Troysan's CMP acetate. "CMP acetate" is chloromethoxypropyl mercuric acetate and is a preservative for water based paints available from Troysan Chemicals, and is described in Bulletin FP-104R of Mar. 1, 1977 which is incorporated herein by reference. Of course, other bacteriostatic and preservative agents, other than Troysan CMP Acetate, may also be employed.

Wetting agents to allow and assure that the latex emulsion system will wet and spread over the metal substrate are commonly employed at levels ranging from 0.1% to about 1% by weight of the composition of this invention. Such are typically surfactants which facilitate adherence of the paint to the substrate surface. For example, Aerosol OT 75 available from Cyanamid is one suitable wetting agent which may be employed. Others well known to those in paint formulation business may also be employed.

Defoaming agents are utilized in order to prevent the composition from foaming during formulation and also in order to prevent foaming during application. Such anti-foaming agents may be employed in the compositions of this invention at levels of from 0.05% to about 1% by weight, most typically from about 0.08% to about 0.2% by weight.

Typical defoaming agents are well known in the paint formulation industry, and therefore a detailed description need not be given. However, suitable results have been achieved when using as a defoaming agents, AF-100, an anti-foaming agent available from Tenneco Chemicals sold under the trademark Nuodex AF-100, which is quaternary ammonium naphthenate. Other anti-foaming agents may, of course, also be used.

Another minor ingredient commonly employed is a viscosity control agent, typically at levels of from 0.5% to 2.0% by weight and most preferred in this composition at levels from about 1% to about 1.5% by weight. Again, such viscosity control agents are well known and therefore a detailed description need not be given. One which has been found satisfactory is Acrysol ASE 60, an aqueous solution of polyacrylate or other polymeric acrylic salts sold by Rohm and Haas Company.

Of course, pigment is also employed and since the compositions are used for undercoating most commonly the pigments are black pigments, such as lampblack. The amount may vary over a fairly wide range, but satisfactory results have been achieved with from about 1% to about 5% more typically within the preferred range of about 2% to about 3%. Suitable pigment can be lampblack No. 866-9907, sold by Tenneco. Other pigments may be employed, with the precise pigment not being critical.

The compositions so far described is an aqueous latex emulsion system, primarily designed for undercoating use for vehicles. This system besides the advantages heretofore mentioned, has good stability and shelf life, exhibits effective coating and sealing as well as good corrosion resistance.

While for some uses solvent based undercoating systems are perhaps less desirable because of odor and application problems, there are times when users prefer such systems. Therefore, in addition to the aqueous system previously described herein, applicants have discovered a satisfactory solvent based system which importantly may have a high solids content, typically as high as 40% to 50%. This solvent base system, like the previously mentioned aqueous base system, is one which employs a butadiene styrene polymer. Its ingredients are shown in the table below, including the preferred specific components.

TABLE 1
SOLVENT BASE SYSTEM

| Ingredient | Proportion |
|---|---|
| Solvent, Mineral Spirits Solvesso 150 (Amsco Division, Union Oil) - Methanol | 30%-50% |
| Viscosity modifier (Bentone 34 (National Lead Pigments and Chemicals Division) | 0%-3% |
| Butadiene Styrene (Kraton 1101 Shell) | 5%-40% |
| Alkylated Aromatic hydrocarbon (Nevchem 100 (Neville) | 0%-20% |
| Filler and Flattening Agent (Microtalc (Pfizer) | 5%-15% |
| Pigment (Tenneco 866-6607 Lampblack) | 1%-5% |

While each of the components of the solvent system mentioned herein are individually known, it is noteworthy that this system is a successful one which is able to achieve a solids concentration of as high as 40%-50%, something which has not heretofore been obtainable. A high solids content is desirable in that it improves the impervious nature of the coating and therefore its effectiveness for corrosion inhibiting.

The following examples are offered to illustrate both the method of preparation and use of the undercoating systems of this invention.

EXAMPLE 1

A latex aqueous emulsion system was prepared in the following manner. The following ingredients were blended in a high speed disperser under slow agitation.

|  | Pounds |
|---|---|
| Water, CMP acetate | 200 |
| Aerosol OT - 75 | 0.50 |
| Ammonia 26 Baume | 4.00 |
| Defoamer (AF-100) | 1.00 |

Gradually the speed of the high speed disperser was increased and 100 pounds of mica 325 mesh as previously described herein, was added. Mixing continued until the composition was completely dispersed and free of lumps. A pH check was made and the pH was adjusted to within the range of 8.5 to 9.0 with ammonium hydroxide (26 Baume). Five hundred and eight (508) pounds of butadiene styrene emulsion sold under the trademark Goodrite 1800-X-73 was added and mixing continued at slow speed.

The following ingredients were premixed: Acrysol ASE 60, 4.4 pounds, and water 17 pounds. This premix was added to the other ingredients along with 20 pounds of Aquasperse black paste 877-9910. Thereafter, the addition tank for the ingredients was washed with 50 pounds of water and 6.6 pounds of Acrysol ASE 60 which was added to the mixture. The viscosity was checked and found to be within the range of 68-72 KU. Final viscosity upon checking the next day showed a viscosity within the range of 70-75 KU. This total batch comprised 912.5 pounds. The solids content was 37.6%.

This composition was used in a spraying application for car undercoating. Upon spraying, the composition was noted to efficiently and effectively coat the car undersurface. The composition also exhibited good stability and shelf life. Upon examination of the cured film of the composition, it showed that the mica platelets formed an overlapped structure to provide an effective substrate barrier. Subsequent checking revealed a substantially moisture impervious barrier. There was also noted a lack of voids which might be caused by air bubbles formed from foaming.

If similar compositions are made, utilizing conventional filler and flattening agents such as magnesia silicate or microtalc, the compositions are noted to be considerably less stable, and their integrity from the standpoint of moisture transmission is not nearly as good.

EXAMPLE 2

The following example is offered to illustrate an example of a usable solvent base system.

| Ingredient | Amount |
|---|---|
| Solvesso 150 | 81.29 pounds |
| Bentone 34 (gelling agent) | 22 pounds |
| Methanol 95% | 6.67 pounds |
| Mineral spirits | 240 pounds |
| Butadiene Styrene (Kraton 1101 rubber) | 71 pounds |
| Nevchem 100 | 165 pounds |
| Microtalc (magnesium silicate filler) | 109 pounds |
| Pigment (Tenneco 866-6607) | 35.20 pounds |

The Solvesso and Bentone were dispersed to a gel and mixing continued until all lumps disappeared. Thereafter, the methanol and mineral spirits were added along with the Kraton 1101 and Nevchem 100. Mixing was continued until all of the polymers dissolved. Thereafter while continually under agitation, the Microtalc was added, as well as the pigment.

This system showed stability, ease of manufacturing and efficiency in terms of spray coating.

The solids content of this system was 48.9%.

While the coating compositions of this invention have specifically been referred to as primarily for car undercoating, and application by spray gun, it should also be noted that other means of application such as brush or roller might also be employed, although significantly less practical.

It can therefore be seen that applicant has provided a useful butadiene styrene aqueous emulsion system for car undercoating, and, in addition, has shown a modified system which employs butadiene styrene in a solvent composition. Moreover, these compositions are effective coating barriers to moisture penetration.

What is claimed is:

1. An aqueous emulsion butadiene styrene latex composition consisting essentially of from about 40% to about 65% weight butadiene styrene, from about 5% to about 20% by weight of mica platelets as filler and flattening agent which effectively prevents vapor transmission and also as an anti-gelling agent for said composition and a sufficient amount of ammonium hydroxide to enhance anti-foaming properties of said composition and to provide a pH within the range of about 7.5 to 10.0 from about 0.02% to about 0.2% by weight of a bacteriostatic agent, from about 0.1% to about 1% by weight of a wetting agent, from about 0.05% to about 1% by weight of a defoaming agent, from about 0.5% to about 2% by weight of a viscosity control agent, and from about 1% to about 5% by weight of pigment, the balance of said composition comprising water.

2. The composition of claim 1 wherein the amount of mica is from 8% to 15%.

3. The composition of claim 1 wherein the amount of ammonium hydroxide is from about 0.05% by weight to about 4% by weight of said composition.

4. The composition of claim 1 wherein the bacteriostatic agent is chlorylmethoxypropyl mercuric acetate.

5. The composition of claim 1 wherein the amount of defoaming agent is from about 0.08% by weight to about 0.2% by weight, and the amount of viscosity control agent is from about 1% by weight to about 1.5% by weight, and the amount of pigment is from about 2% by weight to about 3% by weight of said composition.

6. The composition of claim 1 wherein the butadiene:styrene ratio is from about 70:30 to about 75:25.

7. An improved method of undercoating vehicles for rustproofing comprising,
applying to the undersurface of the metal of the vehicle's body a composition consisting essentially of an aqueous emulsion butadiene styrene latex composition which is from about 40% to about 65% by weight butadiene styrene, from about 5% to about 20% by weight of mica platelets as a filler and flattening agent which effectively prevents vapor transmission and also act as an anti-gelling agent for said composition, and a sufficient amount of ammonium hydroxide to enhance anti-foaming properties of said composition and provide a pH within the range of about 8.5 to 9.0, from about 0.02% to about 0.2% by weight of a bacteriostatic agent, from about 0.1% to about 1% by weight of a wetting agent, from about 0.05% to about 1% by weight of a defoaming agent, from about 0.5% to about 2% by weight of a viscosity control agent, and from about 1% to about 5% by weight of pigment, the balance of said composition comprising water.

8. A solvent base undercoating system primarily for use on rustproofing of vehicles, said system consisting essentially of from about 5% to about 40% by weight of butadiene styrene polymer, from about 30% to about 50% solvent for said polymer, from 0% to 3% of a viscosity modifier for said solution, from 0% to 20% of a hydrocarbon resin, from 5% to 15% of mica platelets as a filler and flattening agent, and from 1% to 5% of pigment for said composition, the total solids concentration of said system being within the range of from 40% to 50% by weight.

* * * * *